United States Patent
Song et al.

(10) Patent No.: US 12,304,010 B1
(45) Date of Patent: May 20, 2025

(54) PRODUCTION LINE FOR WELDING AUTOMOTIVE REAR FLOOR PANEL AND METHOD THEREOF

(71) Applicants: Qingdao University of Technology, Qingdao (CN); Qingdao Huanghai University, Qingdao (CN); Qingdao Hyunion Holding Auto Parts Co., Ltd, Qingdao (CN); Qingdao Jimo Qingli intelligent manufacturing industry Research Institute, Qingdao (CN)

(72) Inventors: Yuxiang Song, Qingdao (CN); Changhe Li, Qingdao (CN); Xu Yan, Qingdao (CN); Mingwei Wang, Qingdao (CN); Zongming Zhou, Qingdao (CN); Yanbin Zhang, Qingdao (CN); Min Yang, Qingdao (CN); Jixin Liu, Qingdao (CN); Yujie Chen, Qingdao (CN); Bingheng Lu, Qingdao (CN); Teng Gao, Qingdao (CN); Mingzheng Liu, Qingdao (CN); Xiaoming Wang, Qingdao (CN)

(73) Assignees: Qingdao University of Technology, Qingdao (CN); Qingdao Huanghai University, Qingdao (CN); Qingdao Hyunion Holding Auto Parts Co., Ltd, Qingdao (CN); Qingdao Jimo Qingli intelligent manufacturing industry Research Institute, Qingdao (CN)

( * ) Notice: Subject to any disclaimer, the term of this patent is extended or adjusted under 35 U.S.C. 154(b) by 0 days.

(21) Appl. No.: 18/751,940

(22) Filed: Jun. 24, 2024

(30) Foreign Application Priority Data

May 17, 2024 (CN) .......................... 202410616929.0

(51) Int. Cl.
*B23K 37/04* (2006.01)
*B21D 53/88* (2006.01)
(Continued)

(52) U.S. Cl.
CPC ............ *B23K 37/047* (2013.01); *B21D 53/88* (2013.01); *B23K 37/0211* (2013.01); *B62D 25/20* (2013.01); *B23K 2101/006* (2018.08)

(58) Field of Classification Search
CPC .............. B23K 37/047; B23K 37/0211; B23K 2101/006; B62D 25/20; B21D 53/88
See application file for complete search history.

(56) References Cited

U.S. PATENT DOCUMENTS

| | | | | |
|---|---|---|---|---|
| 7,011,361 B2 * | 3/2006 | Reed | ...................... | B62D 25/02 296/203.03 |
| 9,126,537 B2 * | 9/2015 | Preisler | .................... | B60R 5/04 |
| 9,296,430 B2 * | 3/2016 | Yonebayashi | .......... | B21D 53/88 |

FOREIGN PATENT DOCUMENTS

JP 3655150 B2 * 6/2005 ......... B23K 11/3063

* cited by examiner

*Primary Examiner* — Bayan Salone

(57) ABSTRACT

A production line and a method for welding the automobile rear floor panels are provided. In view of the current problem that the position of the wheel housing of the rear floor workpiece affected by the reinforcement structure is not convenient to weld directly, the rounded rectangle workpiece conveying path is adopted. When the direction is adjusted during the workpiece conveying process, the posture relative to the previous station also changes. The welding mechanism of the previous station or the welding mechanism of the next station is used to weld the wheel housing position of the workpiece and weld from the lower part of the wheel housing upward. The molten pool and welding slag after welding are not easy to attach to the workpiece under the action of gravity to cause defects, and (Continued)

can reduce interference with the workpiece structure, and improve the welding efficiency.

15 Claims, 16 Drawing Sheets

(51) Int. Cl.
*B23K 37/02* (2006.01)
*B23K 37/047* (2006.01)
*B62D 25/20* (2006.01)
*B23K 101/00* (2006.01)

PRODUCTION LINE FOR WELDING AUTOMOTIVE REAR FLOOR PANEL AND METHOD THEREOF

CROSS-REFERENCE TO RELATED APPLICATIONS

This application claims priority to Chinese Patent Application No. 202410616929.0 with a filing date of May 17, 2024. The content of the aforementioned application, including any intervening amendments thereto, is incorporated herein by reference.

TECHNICAL FIELD

The present disclosure relates to the technical field of automotive welding assembly lines, in particular to a production line for welding automotive rear floor panels and a method thereof.

BACKGROUND

The rear floor area of a car is the carrier for installing components such as wheel hubs and transmission shafts, which requires high strength and stiffness, and it is difficult to meet the performance requirements by stamping a single panel. The rear floor is generally composed of two welded panels, the middle panel and the rear panel. To ensure stiffness requirements, a reinforced structure is provided on the upper surface of the workpiece to increase its effective cross-sectional area, thereby increasing its bending stiffness when subjected to external loads. But this also limits the welding position due to the reinforcement structures such as protrusions, stiffener, and other reinforcement ribs used on its upper surface.

On both sides of the main body of the rear floor panel, there are wheel housings respectively. There is also reinforcement structures connected between the wheel housing and the main body of the rear floor panel. During the welding process, some welding positions and the reinforcement structures on the surface of the wheel housing are prone to interfere with the welding gun. Although the position of the welding points can be adjusted to avoid the surface reinforcement structures, it also limits the distribution of the reinforcement structures. The Chinese patent (public number: CN110039226B) discloses a welding device for assembling and welding the rear floor panel of an automobile. It uses automatic equipment such as welding robots, specialized welding fixtures for workstations, and transfer transportation mechanisms to weld the panels that need to be welded in different positions. The welding mode of the floor panel of the vehicle body is changed to a line mode, which improves production efficiency. It did not consider the inconvenience of welding the wheel housing position, and if it avoids the reinforcement structures to weld, that would lead to an increase in welding points, prolonging the welding process, and affecting the production efficiency of the welding production line. During the welding process, there are also defects caused by molten pool flow and welding slag splashing.

SUMMARY OF PRESENT INVENTION

The objective of the present disclosure is to provide a production line and a method for welding automotive rear floor panels in view of the defects in the prior art, which adopts a workpiece conveying path in rounded rectangle. When the direction is adjusted during the workpiece conveying process, the posture relative to the previous station also changes. The welding mechanism of the previous station or the welding mechanism of the next station is used to weld the wheel housing position of the workpiece, and welding is performed from the lower part of the wheel housing upward. The molten pool and welding slag after welding are not easy to attach to the workpiece under gravity to cause defects, and it can avoid the reinforcement structure on the workpiece, reduce the interference with the workpiece structure, and improve the welding efficiency.

The first objective of the present disclosure is to provide a production line for welding the automotive rear floor panels, adopting the following solution:

The production line for welding automotive rear floor panels, including:

A conveying assembly, comprising a fixture running along a rounded rectangular trajectory, the rounded rectangular trajectory is divided into four straight paths along a running direction, and the fixture is provided with a clamping part to carry a workpiece;

A working device, comprising a loading and unloading station, a gluing station, a welding station, and a detection station corresponding to the four straight paths; the welding station comprises at least three welding mechanisms, wherein the first welding mechanism is capable of acting on an end of the workpiece at the gluing station, and the second welding mechanism is capable of acting on the end of the workpiece at the detection station.

Further, the first welding mechanism is located on an extension line of the straight path corresponding to the gluing station, and the first welding mechanism is configured to weld a wheel housing at the end of the workpiece on the gluing station from bottom to top.

Further, the second welding mechanism is located on an extension line of the straight path corresponding to the detection station, and the second welding mechanism is configured to weld the wheel housing at the end of the workpiece on the detection station from bottom to top.

Further, the loading and unloading station is arranged with a loading and unloading assembly, the gluing station is provided with a gluing assembly, and the detection station is provided with a detection assembly.

Further, the adjacent straight paths are connected by arc-shaped trajectories.

Further, the fixture runs in cycle along the rounded rectangular trajectory.

Further, the conveying assembly further comprises a driving chain, a guide rail, and a track patrol vehicle; the driving chain is a rounded rectangle with a closed end-to-end connection, the guide rail is distributed outside the driving chain, the track patrol vehicle moves along the guide rail, one side of the track patrol vehicle is connected to the driving chain to obtain power, and the fixture is installed on the track patrol vehicle.

Further, the corner positions of the driving chain are matched with sprockets, and at least one of the sprockets is a driving sprocket; and the driving sprocket drives the driving chain to rotate when the driving sprocket is driven by a rotation driving component.

Further, a plurality of the track patrol vehicles are sequentially spaced along a rotation direction of the driving chain.

Further, the guide rail is a rounded rectangle shape, and arc ends at corner positions of the guide rail and arc ends at corner positions of the driving chain are concentrically distributed.

The second objective of the present disclosure is to provide a working method of the production line for welding automotive rear floor panels as mentioned in the first objective, which includes the following steps:

loading a workpiece from the loading and unloading station to the fixture of the conveying assembly, then the workpiece following the fixture along the rounded rectangle trajectory to pass through the gluing station, the welding station, and the detection station in sequence;

coating glue to the workpiece at the gluing station, and welding the front end of the workpiece at the gluing station after the gluing is completed;

welding a non-end part of the workpiece at the welding station;

welding a rear end of the workpiece at the detection station before detecting the workpiece at the detection station, and conducting detection after the welding is completed;

offloading the qualified workpiece at the loading and unloading station, while repairing the unqualified workpiece at the gluing station, the welding station, and the detection station again until the unqualified workpiece pass the detection before offloading.

Further, the front end of the workpiece is welded at a rear end of the straight path corresponding to the gluing station.

Further, when welding a workpiece on the gluing station, a welding gun of the first welding mechanism stretches into the wheel housing at an end of the workpiece to weld from bottom to top.

Further, the rear end of the workpiece is welded at the front end of the straight path corresponding to the detection station.

Further, when welding workpieces on the detection station, the welding gun of the second welding mechanism stretches into the wheel housing at the end of the workpiece to weld from bottom to top.

Compared with existing technology, the advantages and positive effects of the present disclosure are as below:

(1) In view of the current problem that the position of the wheel housing of the rear floor workpiece affected by the reinforcement structure is difficult to weld directly, the rounded rectangle workpiece conveying path is adopted. When the direction is adjusted during the workpiece conveying process, the posture relative to the previous station also changes. The welding mechanism of the previous station or the welding mechanism of the next station is used to weld the position of the wheel housing of the workpiece and weld from the lower part of the wheel housing upward. The molten pool and welding slag after welding are not easy to attach to the workpiece under gravity to cause defects, and can avoid the reinforcement structure on the workpiece, reduce interference with the workpiece structure, and improve the welding efficiency.

(2) By using a rounded rectangular running trajectory, it achieves the rotation cycle operation of the fixture. When identifying defects in the workpiece processing at the detection station, there is no need to unload the workpiece, but repairing the workpiece through the loading and unloading station, gluing station, and welding station, reducing the long-distance transportation process during rework in the welding production line and improving welding and repair efficiency.

(3) Compared to adjusting the workpiece posture through flipping, a driving chain is used to drive the fixture to move in a circular motion according to the rounded rectangular trajectory. By utilizing the changes in the workpiece posture at the turning position, the welding mechanism is configured to a suitable welding position. During the conveying process, the workpiece always remains on the fixture and is on a straight path, making it easier to confirm the workpiece position and perform precise welding.

(4) The use of a driving chain facilitates the formation of the required rounded rectangular path. The guide rail with the rounded rectangular shape is used to guide the track patrol vehicle carrying the fixture, ensuring the accuracy of the workpiece during operation, thereby matching the distribution positions of the gluing assembly, the loading and unloading assembly, the detection assembly, and the welding mechanism, facilitating the determination of the relative position between the end of manipulator of each assembly and the workpiece, and reducing interference.

BRIEF DESCRIPTION OF THE DRAWINGS

The accompanying drawings of the specification, which form a part of the present disclosure, are used to provide a further understanding of the present disclosure. The illustrative embodiments and their illustration of the present disclosure are used to illustrate the present disclosure and do not constitute an improper limitation of the present disclosure.

Figure 1:
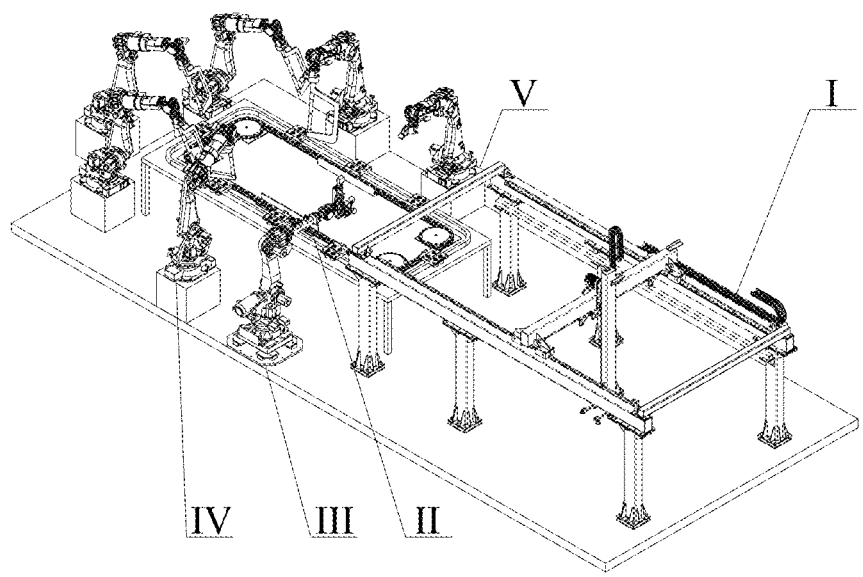
FIG. 1 is an axonometric view of the a production line for welding automotive rear floor panels in Embodiment 1 and Embodiment 2 of the present disclosure.

The reference marks in the drawings: I. loading and unloading assembly, II. conveying assembly, III. gluing assembly, IV. welding assembly, V. detection assembly.

I-1. gantry truss, I-2. vacuum adsorption mechanism.

II-1. driving sprocket, II-2. track patrol vehicle, II-3. guide rail, II-4. support plate, II-5. driven sprocket, II-6. driving chain, II-7. rotation driving component, II-2-1. mounting nut, II-2-2. washer, II-2-3. screw, II-2-4. vehicle body, II-2-5. connection hole, II-2-6. blind rivet positioning groove, II-2-7. wheel, II-2-8. mounting hole.

III-1. gluing robot, III-2. gluing gun, III-3. visual sensor for model detection of automobile rear floor panels, III-4. visual sensor for gluing path, III-5. visual sensor for gluing quality detection.

IV-1. welding gun, IV-1-1. punch, IV-1-2. rivet, IV-1-3. upper layer material, IV-1-4. lower layer material, IV-1-5. mold, IV-1-6. hollow structure, IV-2. cold metal transition (CMT) welding gun, IV-2-2. cold metal transition power supply, IV-2-3. wire feeding control system, IV-2-4. robot control system, IV-2-5. editor, IV-3. fixture, IV-3-1. workpiece, IV-3-2. blind rivet mounting groove, IV-3-3. blind rivet.

DETAILED DESCRIPTION OF THE EMBODIMENTS

Embodiment 1

In a typical embodiment of the present disclosure, as shown in FIGS. 1 to 16, a production line for welding automotive rear floor panels is provided.

At present, the production line for welding the automotive rear floor panels mostly adopts a one-way conveying method for processing. After welding is completed, detection is carried out. If any unqualified situation occurs during detection, it needs to be transported upstream of the welding production line, re-clamped and repaired, resulting in low processing efficiency. Moreover, for the position of the wheel housing on the rear floor panel, due to the presence of many reinforcement structures, when the welding point position is close to the reinforcement structure, interference between the reinforcement structure and the welding gun IV-1 is prone to occur, making it difficult to operate the welding work. The adjustment of the welding point position may increase the welding process, thereby increasing the process flow and affecting production efficiency. Based on this, in this embodiment, a production line for welding the automobile rear floor panels is provided, which adopts a fixture running on a rounded rectangle trajectory. The fixture carries the workpiece and transports it along the rounded rectangle trajectory, passing through a loading and unloading station, a gluing station, a welding station, and a detection station in sequence. When unqualified workpieces appear, it can be repaired at each station without offloading, thereby improving production efficiency.

In addition, by using the rounded rectangle workpiece conveying path, when the direction is adjusted during the workpiece conveying process, the posture relative to the previous station also changes. The welding mechanism of the previous station or the welding mechanism of the next station is used to weld the position of the wheel housing of the workpiece and weld from the lower part of the wheel housing upward. The molten pool and welding slag after welding are not easy to attach to the workpiece under gravity to cause defects, and can avoid the reinforcement structure on the workpiece, reduce interference with the workpiece structure, and improve the welding efficiency.

As shown in FIG. 1, the production line for welding the automotive rear floor panels mainly includes a conveying assembly II, a loading and unloading assembly I, a gluing assembly III, a welding assembly IV, and a detection assembly V. The loading and unloading assembly I, the gluing assembly III, welding assembly IV, and the detection assembly V work together as the working device and can perform corresponding loading, unloading, and welding treatments on the workpiece. The conveying assembly II is equipped with a fixture, which runs along the rounded rectangle trajectory, thereby driving the clamping part that carries the workpiece to move, and the workpiece can be placed on the clamping part.

Figure 2:
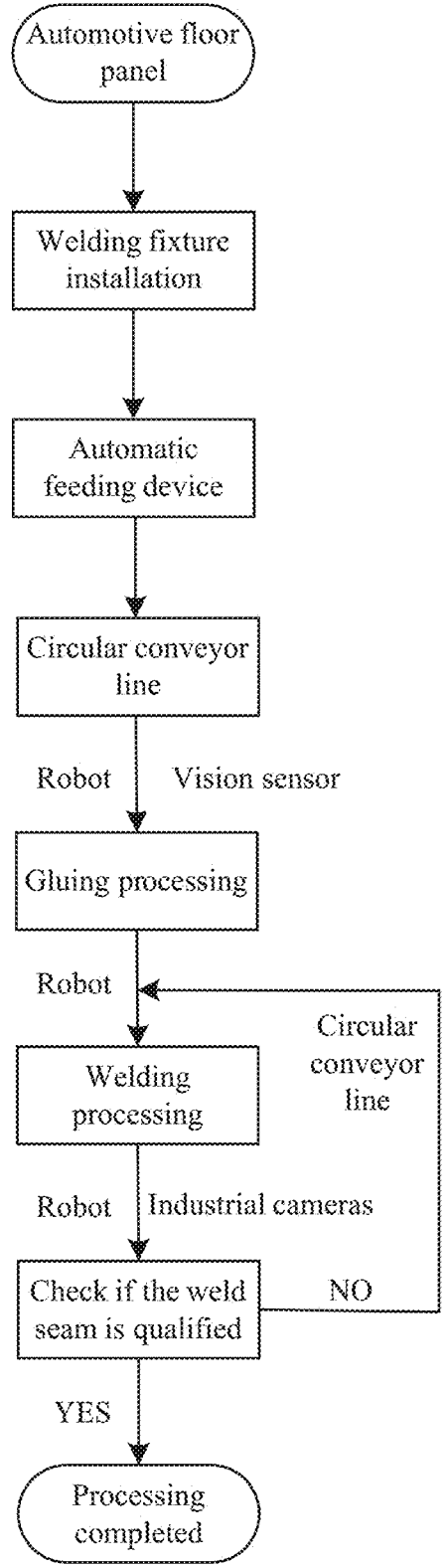
FIG. 2 is a production flow chart of the production line for welding automotive rear floor panels in Embodiment 1 and Embodiment 2 of the present disclosure.

As shown in FIG. 2, the workpiece is loaded from the loading and unloading station to the fixture of the conveying assembly II. The workpiece is coated with glue at the gluing station, the non-end position of the workpiece is welded at the welding station, and the detection of the workpiece is conduct at the detection station. The qualified workpieces are offloaded at the loading and unloading station, while the unqualified workpieces are repaired at the gluing station, the welding station, and the detection station again until they pass the detection before being offloaded.

Figure 4:
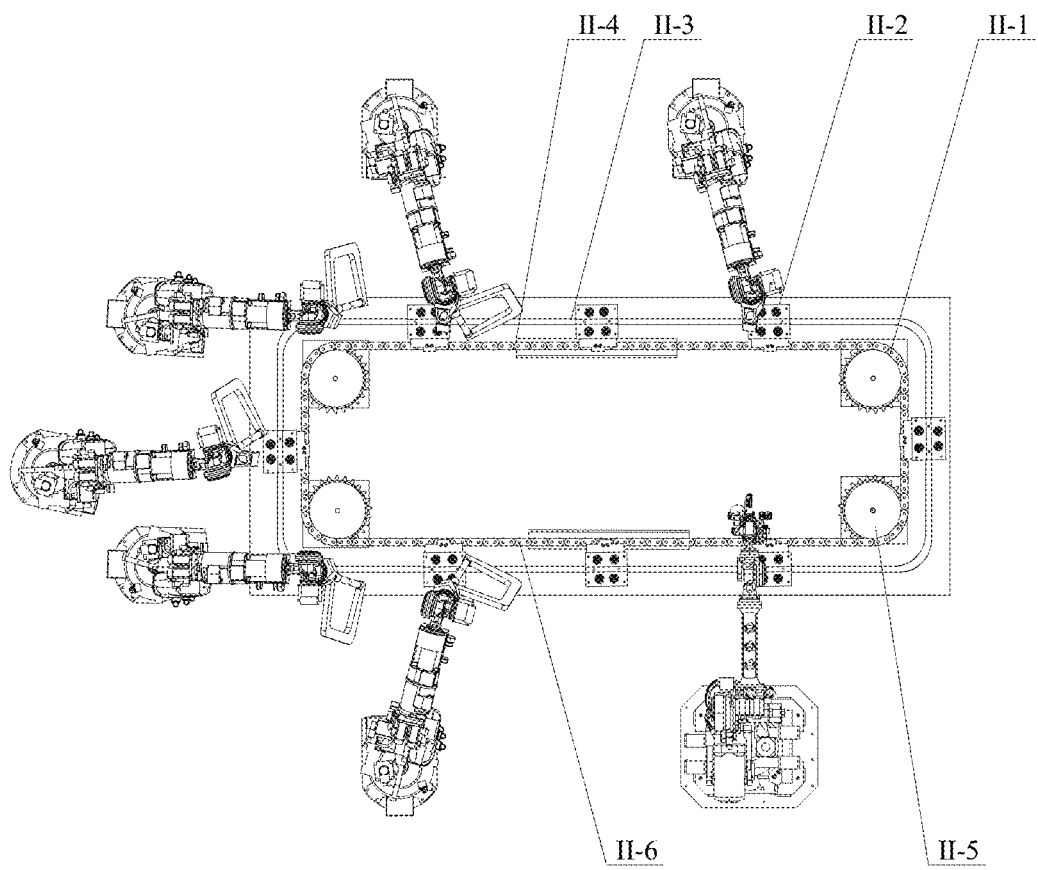
FIG. 4 is a schematic diagram of a conveying assembly in Embodiment 1 and Embodiment 2 of the present disclosure.
Figure 5:
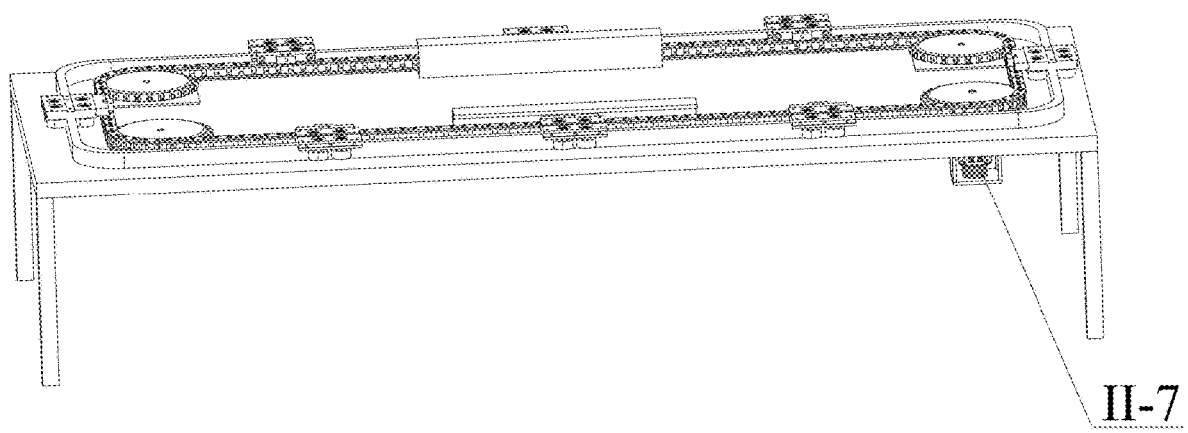
FIG. 5 is an axonometric diagram of a conveying assembly in Embodiment 1 and Embodiment 2 of the present disclosure.

The rounded rectangular trajectory of the fixture is divided into four segments, each segment being a straight path, forming four straight paths, as shown in FIG. 4. There is an arc-shaped trajectory for transition between each two adjacent straight paths, and the adjacent straight paths are connected by arc trajectory transition, allowing the fixture to smoothly move from one straight path to another through the arc trajectory.

The loading and unloading station, the gluing station, the welding station, and the detection station correspond one-to-one with four straight paths. The loading and unloading station is equipped with the loading and unloading assembly I, the gluing station is equipped with the gluing assembly III, and the detection station is equipped with the detection assembly V. The welding station is equipped with the welding assembly IV. The welding assembly IV includes at least three welding mechanisms. The first welding mechanism can act on the end of the workpiece at the gluing station, and the second welding mechanism can act on the end of the workpiece at the detection station, welding the end of the workpiece from outside. Other welding mechanisms can weld the non-end positions of the workpiece.

The first welding mechanism is located on an extension line of the straight path corresponding to the gluing station, and the first welding mechanism is configured to weld a wheel housing at the end of the workpiece on the gluing station from bottom to top. Taking the posture shown in FIG. 4 as an example, the first welding mechanism is located on the left side of the gluing station and in the same column as the welding station. The second welding mechanism is located on an extension line of the straight path corresponding to the detection station, and the second welding mechanism is configured to weld the wheel housing at the end of the workpiece on the detection station from bottom to top. Taking the posture shown in FIG. 4 as an example, the second welding mechanism is located on the left side of the detection station and in the same column as the welding station.

The fixture runs in circle along the rounded rectangle trajectory, so that the workpiece on the carrying part of the fixture runs along the rounded rectangle trajectory, changing the relative position of the workpiece and various components of the working device, and matching different components for operation. The distribution positions of the first welding mechanism and the second welding mechanism do not affect the operation of the workpiece on the conveying assembly II, the workpiece can be welded by adjusting the position of the welding gun IV-1, while avoiding interference during workpiece transportation.

Figure 16:
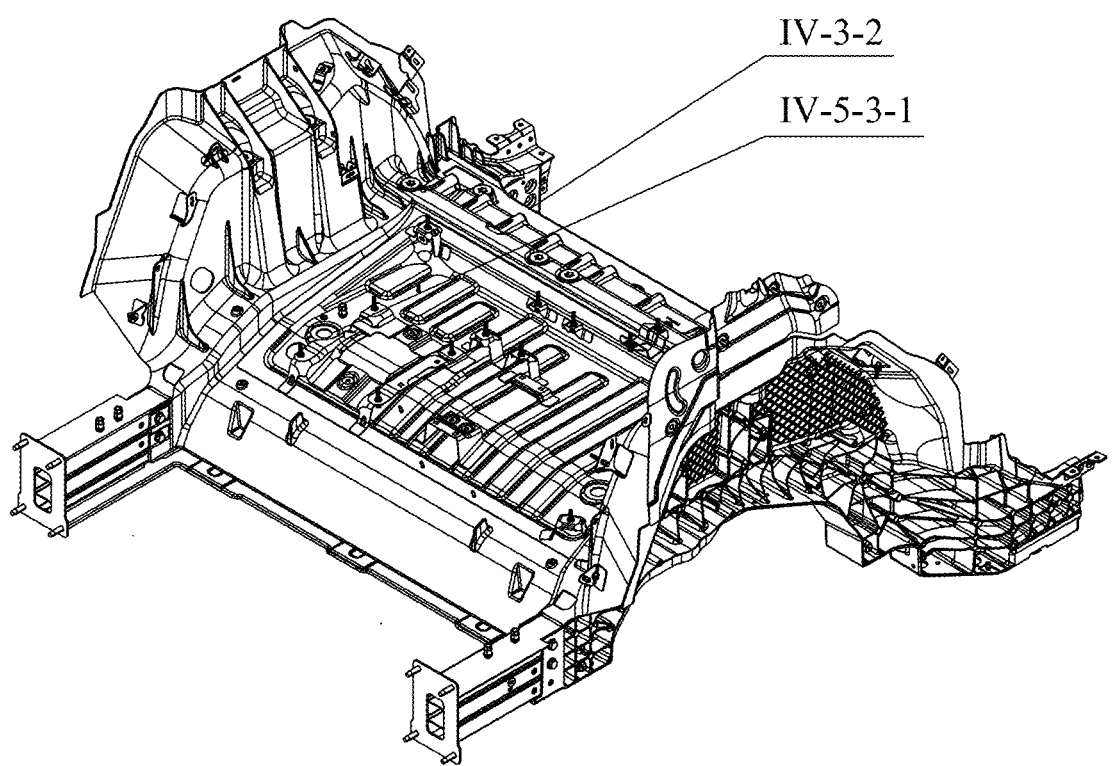
FIG. 16 is an axonometric view of the automotive rear floor workpiece in Embodiment 1 and Embodiment 2 of the present disclosure.

As shown in FIG. 16, the wheel housing is located at both ends of the main body of the rear floor panel. The wheel housing is a plate structure with a raised top surface and a concave bottom surface. In order to improve the connection strength between the wheel housing and the main body of the rear floor panel, a reinforcement structure is also arranged between the wheel housing and the main body of the rear floor panel. Welding points are distributed on the wheel housing and the main body of the rear floor panel, and some welding positions and the reinforcement structure on the upper surface of the wheel housing are prone to interference with the welding gun. If welding is applied by adjusting the workpiece through flipping, although the reinforcement structure on the upper surface is avoided, repositioning is required after the flipping process and restoring the posture after welding, which increases the operating process. Repeated clamping can also lead to lower processing efficiency. In this embodiment, compared to adjusting the workpiece posture through flipping, the driving chain is used to drive the fixture to move in a circular motion according to the rounded rectangle trajectory. By utilizing the change in workpiece posture at the turning position, the welding machine is configured to a suitable welding position. During the conveying process, the workpiece always remains on the fixture and is on a straight path, which facilitates confirmation of the workpiece position and accurate welding.

In addition, it should be pointed out that in this embodiment, the working posture of the welding gun IV-1 for welding the wheel housing is also adjusted, and welding is carried out on the wheel housing from the bottom-up direction. After welding, the molten pool and welding slag are not easily attached to the workpiece under the action of gravity to cause defects, and can avoid the reinforcement structure on the workpiece, reduce interference with the workpiece structure, and improve welding efficiency.

Figure 3:
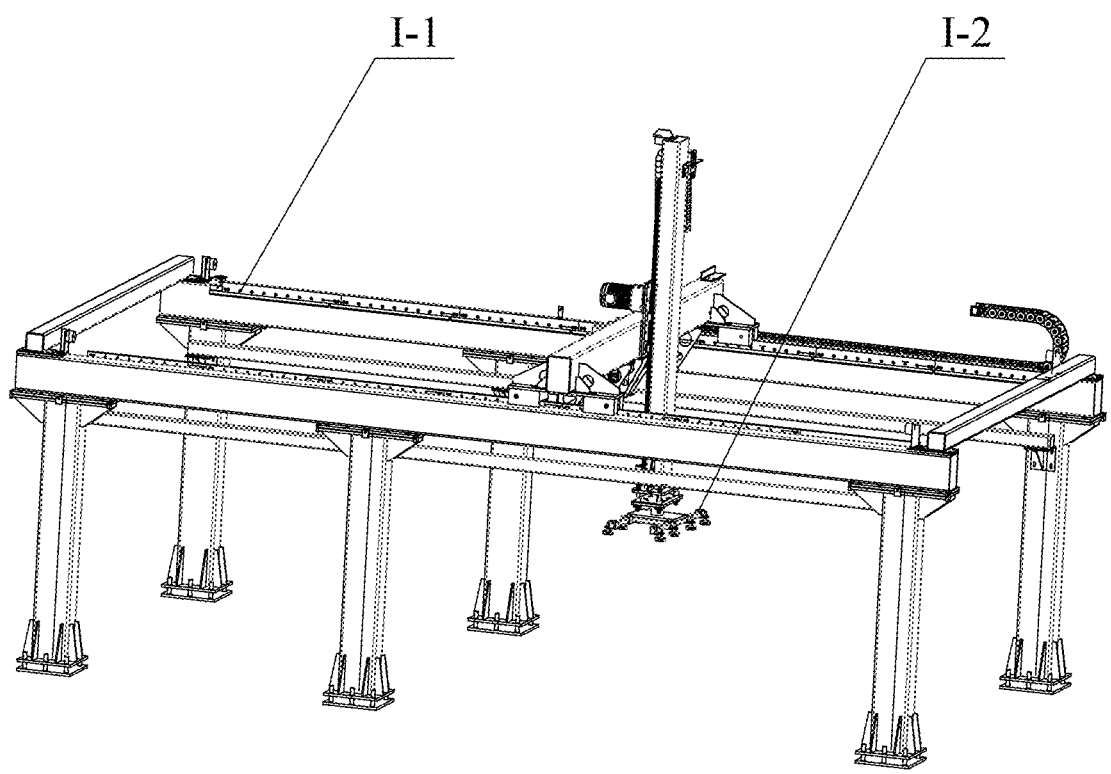
FIG. 3 is an axonometric view of a loading and unloading assembly in Embodiment 1 and Embodiment 2 of the present disclosure.

As shown in FIG. 3, the loading and unloading assembly I includes a gantry truss I-1 and a vacuum adsorption mechanism I-2. The gantry truss I-1 is a three-axis motion mechanism, and the vacuum adsorption mechanism I-2 is installed at the end of the gantry truss I-1, so that the gantry truss I-1 drives the vacuum adsorption mechanism I-2 to adjust. The vacuum adsorption mechanism I-2 can grasp the workpiece for loading and unloading, load the workpiece to the carrying part of the fixture, and unload the workpiece on the carrying part to the workpiece stacking area.

As shown in FIG. 4, the conveying assembly II also includes a driving chain II-6, a guide rail II-3, a track patrol vehicle II-2 and a rotation driving component II-7. The driving chain II-6 is a rounded rectangle with a closed end-to-end connection. The guide rail II-3 is distributed outside the driving chain, and the track patrol vehicle II-2 moves along the guide rail II-3. One side of the track patrol vehicle II-2 is connected to the driving chain II-6 to obtain power, and the fixture is installed on the track patrol vehicle II-2. The corner positions of the driving chain II-6 are matched with sprockets, and at least one of the sprockets is the driving sprocket II-1. When the driving sprocket II-1 is driven by the rotation driving component, it can drive the driving chain II-6 and other driven sprockets II-5 to rotate.

In the rotation direction along the driving chain II-6, a plurality of track patrol vehicles II-2 are interval distribution. The guide rail II-3 is a rounded rectangle shape. The arc end at the corner position of the guide rail II-3 and the arc end at the corner position of driving chain II-6 are concentrically distributed.

Specifically, as shown in FIG. 4, in this embodiment, there is one driving sprocket II-1 and three driven sprockets. The driving sprocket II-1 and three driven sprockets II-5 are distributed at the four corner positions of the rounded rectangle. The rotation driving component uses a transmission motor, which drives the driving sprocket II-1 to rotate. The driving chain II-6 connects the driving sprocket II-1 and three driven sprockets II-5 in series. The track patrol vehicles II-2 is equipped with connecting holes II-2-5 and is installed on the driving chain II-6 through screws II-2-3, achieving movement on guide rail II-3. There is a support plate II-4 between the two sprockets, which can tension the driving chain II-6 and prevent it from sagging in the middle due to being too long.

Figure 6:
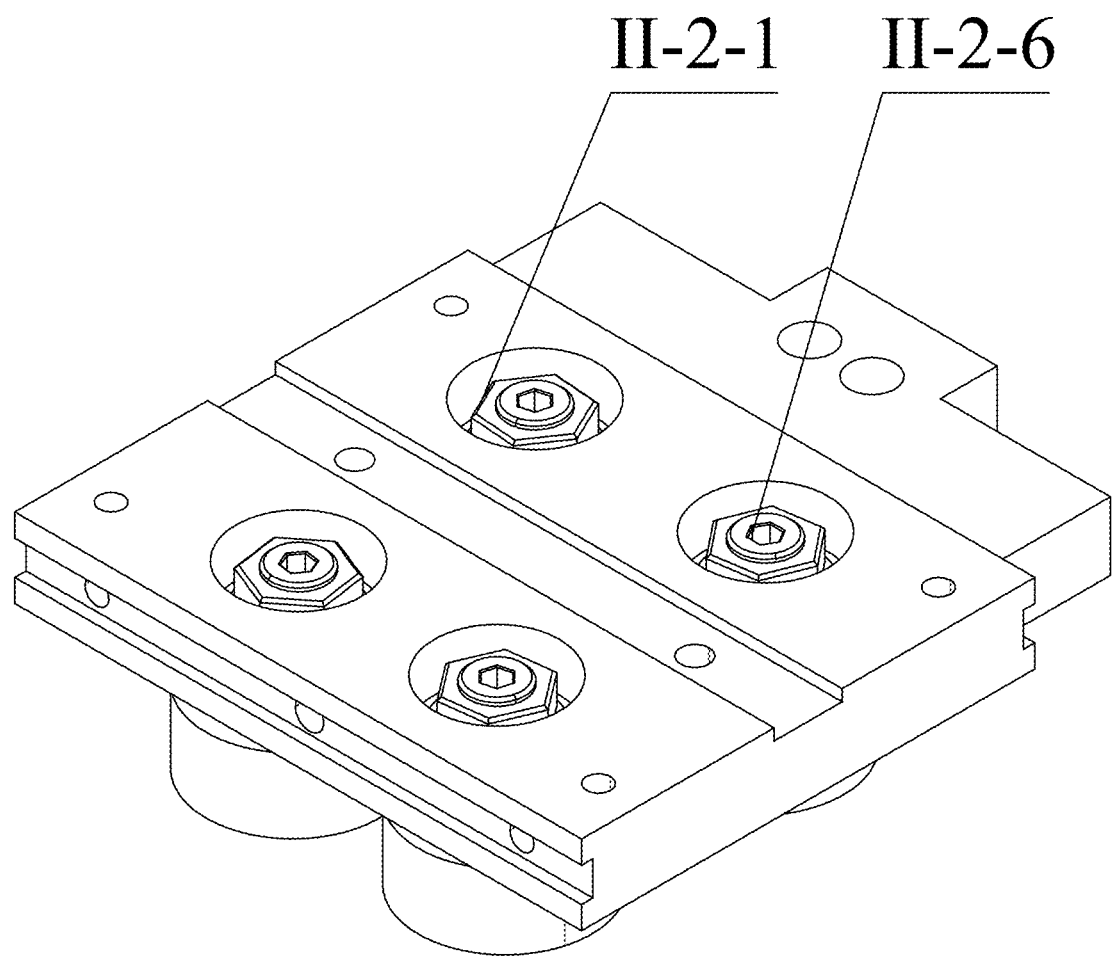
FIG. 6 is an axonometric view of a track patrol vehicle in Embodiment 1 and Embodiment 2 of the present disclosure.
Figure 7:
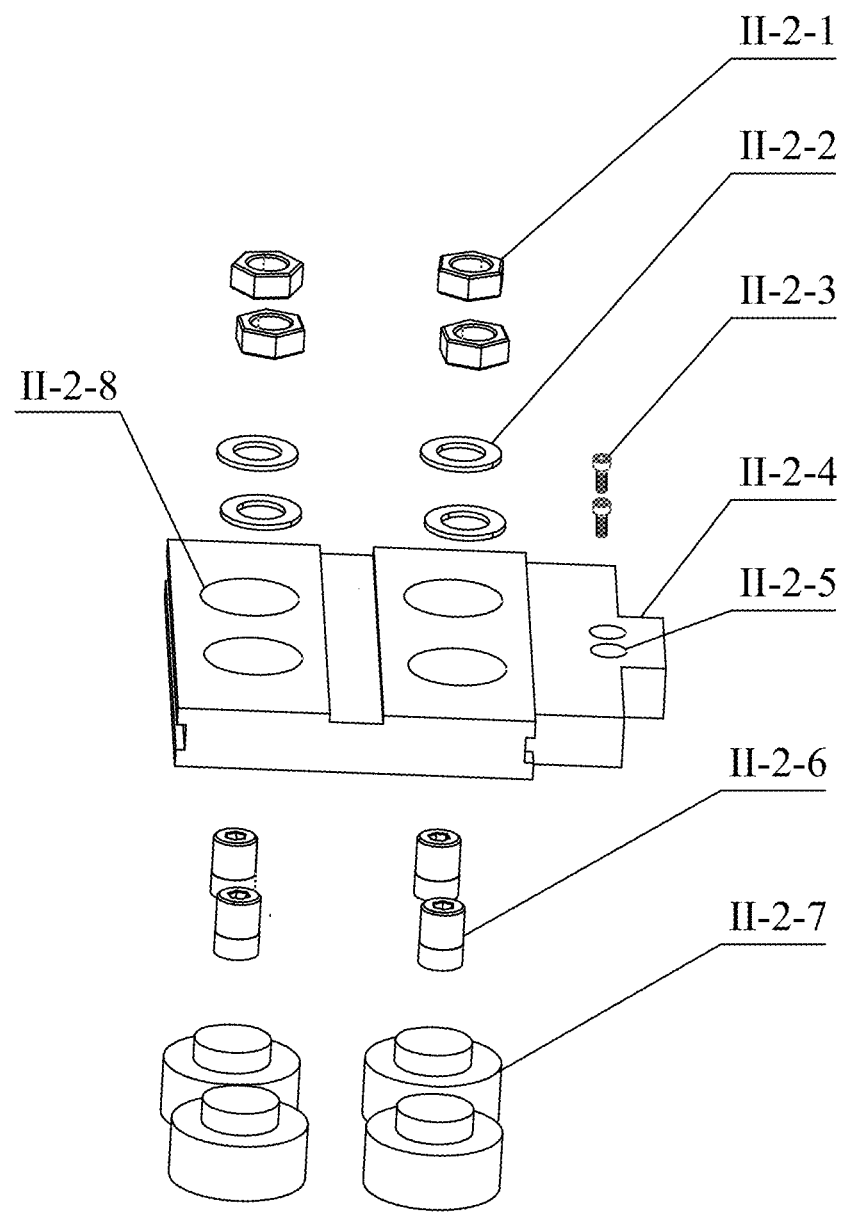
FIG. 7 is a schematic diagram of the explosive structure of the track patrol vehicle in Embodiment 1 and Embodiment 2 of the present disclosure.
Figure 8:
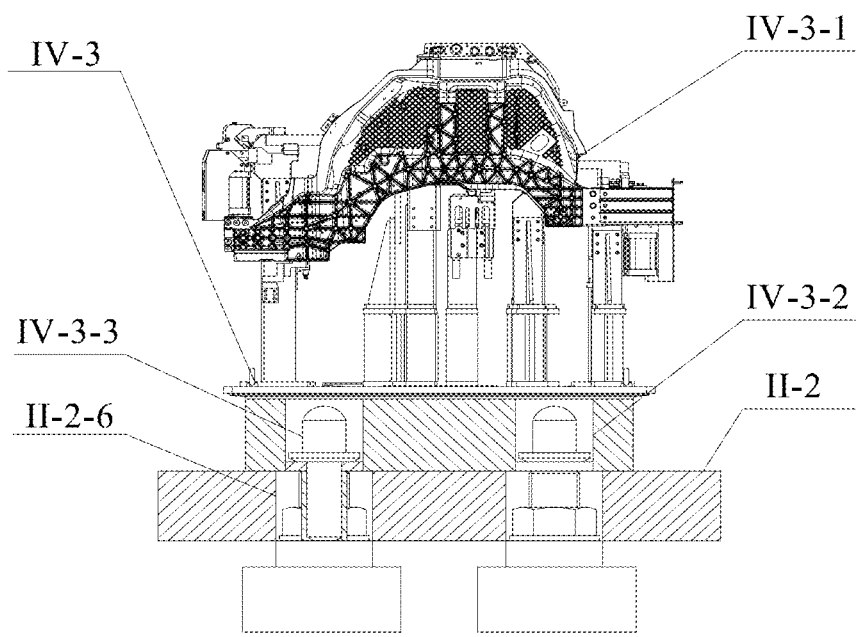
FIG. 8 is a schematic diagram of the connection between the track patrol vehicle and the fixture in Embodiment 1 and Embodiment 2 of the present disclosure.

As shown in FIG. 6-FIG. 8, the track patrol vehicles II-2 consists of a mounting nut II-2-1, a washer II-2-2, a screw II-2-3, a vehicle body II-24, a connection hole II-2-5, a blind rivet positioning groove II-2-6, a wheel II-2-7, and a mounting hole II-2-8. Specifically, there are mounting holes II-2-8 and connection holes II-2-5 on the vehicle body II-2-4, which are respectively used for installing the blind rivet positioning groove II-2-6 and achieving connection with the driving chain II-6. The blind rivet positioning groove II-2-6 is externally threaded and fixed in the mounting hole II-2-8 by the washer II-2-2 and the mounting nut II-2-1. The washer II-2-2 is used to disperse the tightening pressure and prevent damage to the vehicle body II-2-4. The bottom of the fixture is equipped with a blind rivet mounting groove IV-3-2, which is used for installing blind rivet IV-3-3. The blind rivet IV-3-3 of the fixture can be matched with the blind rivet positioning groove II-2-6 of the track patrol vehicle II-2, so that the fixture can be installed on the track patrol vehicle II-2, and the fixture, along with the workpiece carried above it, moves with the track patrol vehicle II-2. It used to achieve positioning during the conveying process of workpieces. As the fixture transports along the rounded rectangular trajectory, it reduces the displacement of workpieces caused by shaking when changing the conveying direction, and improves positioning accuracy.

Figure 9:
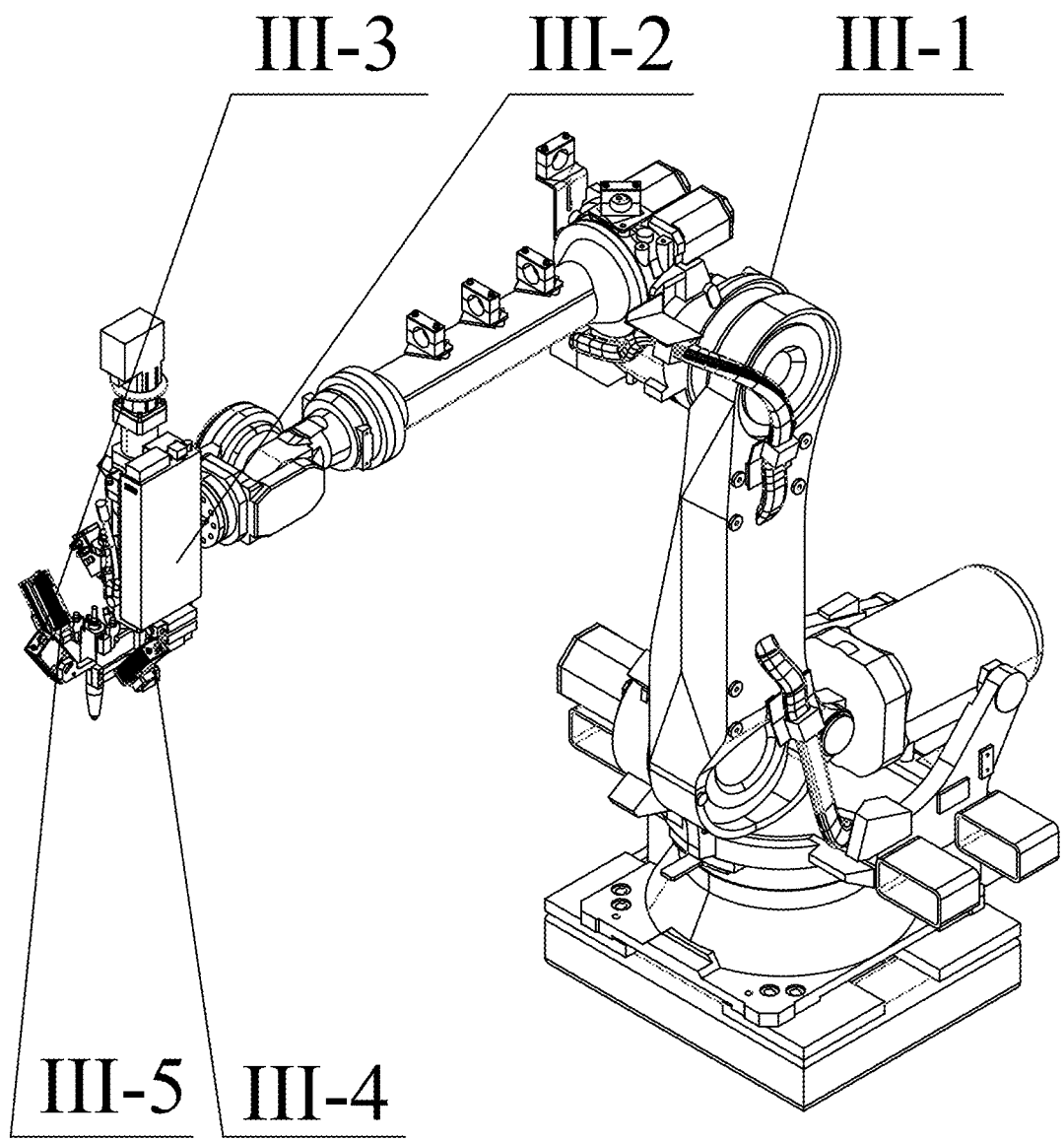
FIG. 9 is an axonometric view of the gluing mechanism in Embodiment 1 and Embodiment 2 of the present disclosure.
Figure 10:
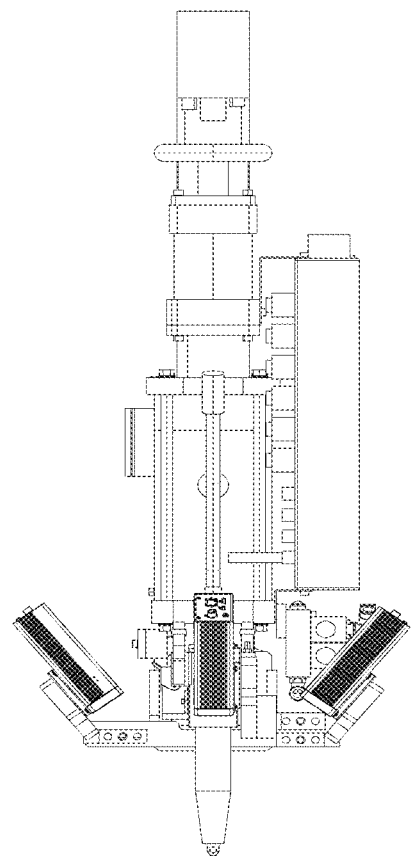
FIG. 10 is a schematic diagram of the gluing mechanism in Embodiment 1 and Embodiment 2 of the present disclosure.

As shown in FIG. 9-FIG. 10, in this embodiment, the gluing assembly III is composed of a gluing robot III-1, a gluing gun III-2, a visual sensor for model detection of automobile rear floor panels III-3, a visual sensor for gluing path III-4, and a visual sensor for gluing quality detection III-5. The visual sensor for model detection of automobile rear floor panels III-3, the visual sensor for gluing path III-4, and the visual sensor for gluing quality detection III-5 are simultaneously fixed on the gluing gun III-2 and move together with the gluing gun III-2. Wherein, the visual sensor III-3 for model detection of the rear floor of the visual sensor for model detection of automobile rear floor panels III-3 is located on the upper front side of the gluing gun III-2, the visual sensor for gluing path III-4 is located on the right side of the gluing gun III-2, and the visual sensor for gluing quality detection III-5 is located on the left side of the gluing gun III-2.

Specifically, before gluing, the gluing robot III-1 adjusts the working visual filed to the gluing area to recognize the rear floor of the car. The visual sensor for model detection of automobile rear floor panels III-3 is used to enable the robot to actively call the matching program to ensure the accuracy of the robot gluing. When applying glue, the visual sensor for gluing path III-4 follows the gluing gun III-2 to complete the gluing action, which is used to prioritize space recognition and provide it to the control system to control the path planning of the gluing gun III-2. The visual sensor for gluing quality detection III-5 is used to collect the gluing images in real-time for subsequent processing and analysis. The visual sensor is integrated with the MES control system to detect and analyze the collected photos of the adhesive strip through image processing methods, ensuring the quality and continuity of the adhesive coating.

Figure 11:
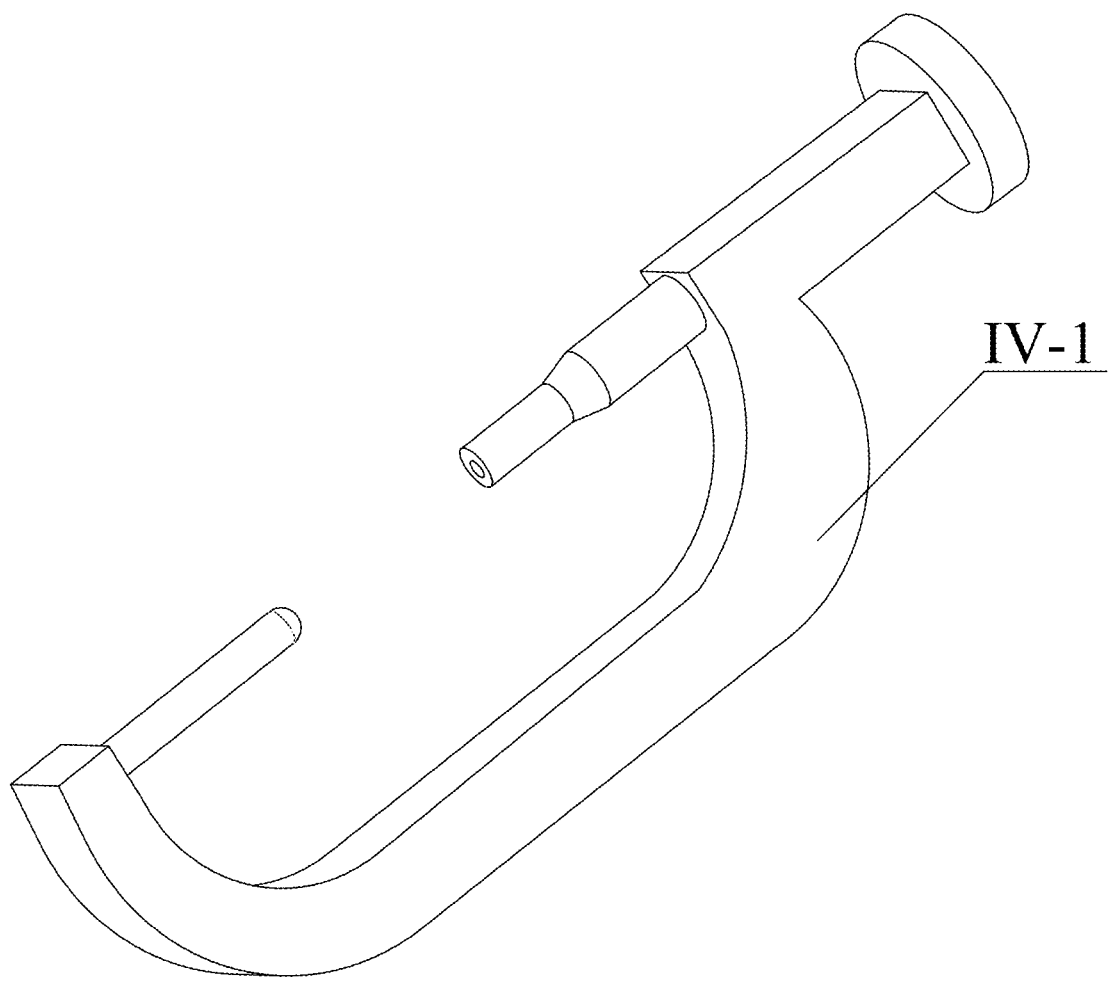
FIG. 11 is a schematic diagram of a SPR (Self-piercing rivet) cold connection technology welding gun in Embodiment 1 and Embodiment 2 of the present disclosure.
Figure 12:
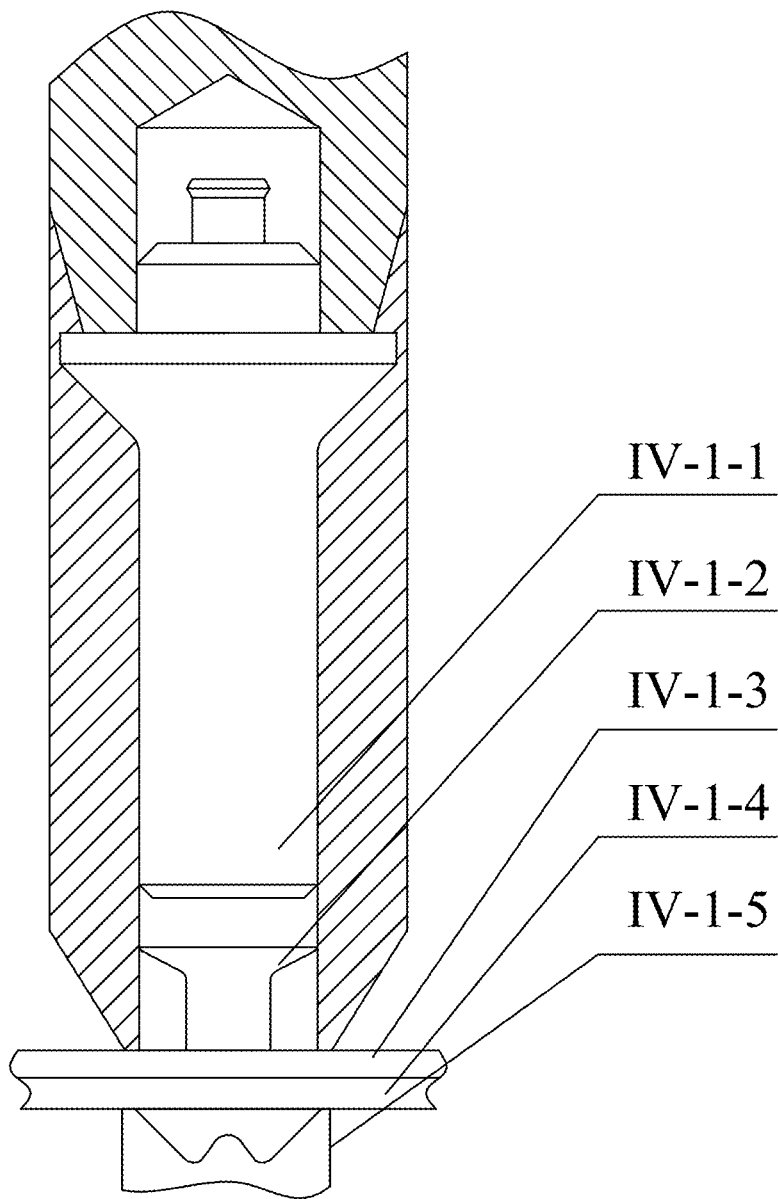
FIG. 12 shows a sectional view of the SPR cold connection technology welding gun in Embodiment 1 and Embodiment 2 of the present disclosure.
Figure 13:
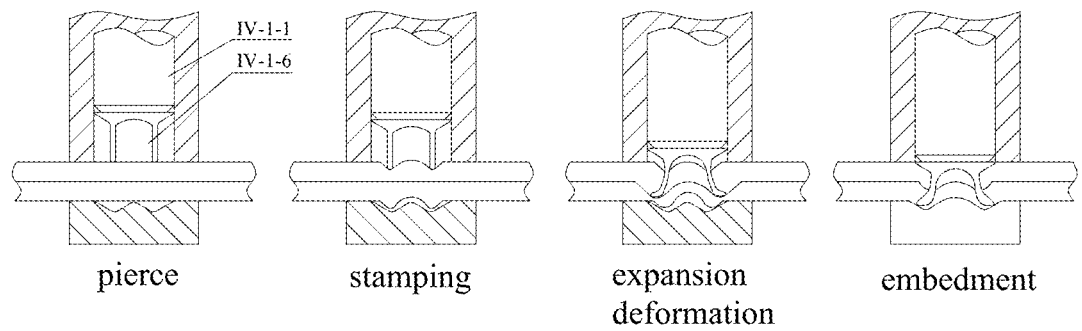
FIG. 13 is a schematic diagram of the welding process of SPR cold connection technology in Embodiment 1 and Embodiment 2 of the present disclosure.

As shown in FIG. 11 to FIG. 13, the welding assembly IV in this embodiment includes a plurality of welding mechanisms, which are composed of a multi-station welding robot IV, an SPR cold connection system, and a cold metal transition (CMT) welding system IV-2.

Specifically, the SPR cold connection technology is shown in FIGS. 10 to 12. Taking the welding of the upper layer material IV-1-3 and the lower layer material IV-1-4 on the workpiece as an example, under the pressure of the welding gun IV-1 in the SPR cold connection technology, the welding punch IV-1-1 causes the rivet IV-1-2 to penetrate the upper layer material IV-1-3. The hollow structure IV-1-6 of the rivet leg flows and extends into the lower layer material IV-1-4 under the action of the mold IV-1-5, but does not puncture the lower layer material IV-1-4, forming a mutually embedded and plastic deformed rivet connection. The specific welding process includes:

1. The welding punch IV-1-1 moves downwards, pushing the rivet IV-1-2 to pierce through the upper material IV-1-3. At the same time, the rivet also drives the plastic deformation of the lower material IV-1-4 into the mold IV-1-5.

2. Expansion stage: As the welding process progresses, the hollow structure IV-1-6 at the leg of rivet IV-1-2 gradually opens, and the lower material IV-1-4 undergoes plastic deformation, gradually filling into mold IV-1-5. Under the joint action of the punch-pin and the boss, the hollow structure IV-1-6 of the leg of the rivet IV-1-2 expands towards the periphery and is embedded in the lower material IV-1-4, forming a mechanical interlocking structure between the rivet IV-1-2 and the panel.

3. Riveting completion: When the welding punch IV-1-1 continues to press down on the rivet IV-1-2 until the rivet head of rivet IV-1-2 is in close contact and level with the upper surface of the first layer material IV-1-3, the welding is considered complete. At this point, the edge pressing will release the edge pressing force, and the welding punch IV-1-1 will return to its initial position, the welding is completed.

Figure 14:
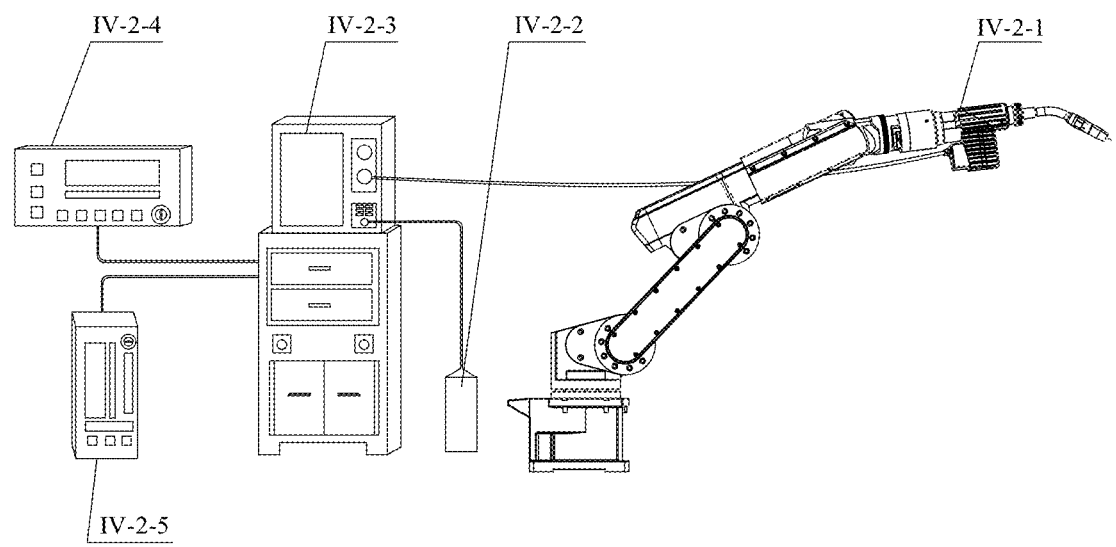
FIG. 14 is a schematic diagram of the CMT cold metal transition welding equipment in Embodiment 1 and Embodiment 2 of the present disclosure.

The cold metal transition welding is shown in FIG. 14. The basic principle of cold metal is short-circuit transition welding technology. When the cold metal transition welding technology uses the short-circuit operation of the contact between the molten droplet and the molten pool, the welding wire not only has a forward wire feeding motion, but also a backward pulling motion.

The cold metal transition (CMT) welding process adopts a cold metal transition (CMT) welding system IV-2, which has functions such as welding parameter monitoring and artificial intelligence management. The cold metal transition (CMT) welding gun IV-2-1 is connected to a digital wire feeding control system IV-2-3. The wire feeding control system IV-2-3 controls the forward and backward movement of the welding wire by controlling the cold metal transition power supply IV-2-2, ensuring a perfect physical combination between the wire feeding process and the droplet transition process, making the arc more stable. The mechanical conversion frequency enables the high-speed completion of the wire feeding and backward operation. The robot welding control system IV-2-4 adopts KR50 robot from KUKA company, which has high static and dynamic accuracy and is an important condition to ensure arc stability during the welding process. The editor IV-2-5 is used to collect welding process parameters.

Figure 15:
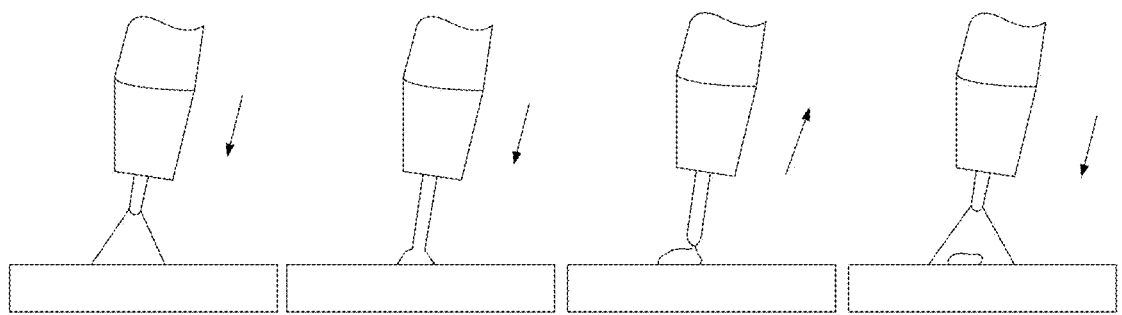
FIG. 15 is a schematic diagram of the CMT cold metal transition welding process in Embodiment 1 and Embodiment 2 of the present disclosure.

As shown in FIG. 15, the cold metal transition (CMT) welding process is divided into arc ignition and molten droplet formation; the molten droplet comes into contact with the molten pool, causing the electric arc to extinguish and the current to decrease; current short-circuit occurs, welding wire is withdrawn, the molten droplet is falling off, and short-circuit current maintains minimum; the direction of wire movement changes, the arc reignites, and the transition process of the next molten droplet begins in four parts. Specifically, it includes:

1. The arc burns and the welding wire is fed forward until a short-circuit is formed in the molten droplet.

2. When a short-circuit signal is detected by the digital wire feeding control system IV-2-3, it will be fed back to the front-end wire feeding mechanism through the editor IV-2-5.

3. The CMT welding system IV-2 responds to withdrawn welding wire. At this time, the wire feeding speed is reversed, and the wire is reversed returned. At this time, the current and voltage are almost zero.

4. When the molten droplet falls off from the end of the welding wire, the arc reignites, the welding wire feeds forward, and the molten droplet transition restarts.

In the process of cold metal transition welding, in addition to the above forces, the transfer force of the molten droplet suddenly terminates the forward wire feeding and the wire is reversed return at a certain speed during the process of the molten droplet about to transition instantly, resulting in a reverse force. For the molten droplet about to transition, in order to maintain inertia, a reverse impulse is inevitably generated. The magnitude of the reverse impulse depends on the wire feeding speed, instantaneous reverse return speed, and the time required to reach the reverse return speed, which meets the requirements of equation (1):

$$F_{\Delta t} = mv_1 - mv_2 \tag{1}$$

In the formula, v1 and v2 respectively represent the wire return and wire feed speeds (mm/s); m is the mass of the molten droplet at the moment of transition (g); $\Delta t$ is the time(s) reaching the set wire return speed from the wire feeding speed during a certain cycle.

The appearance of vehicle body components is complex, mostly three-dimensional curved surfaces, belonging to thin panels, and the size is large, with low strength and stiffness. For thin or easily variable workpieces, the fixture controls the 6 degrees of freedom of the workpiece to be welded through two positioning pins and a positioning surface. The stiffness is ensured through multi-point clamping, thereby reducing the possibility of deformation during the welding process. There is a reserved hole on the workpiece to be welded, and the fixture is provided with a positioning pin. The positioning pin is matched with the reserved positioning hole feature on the workpiece to complete the main positioning of the workpiece. Three support nails determine a support surface to complete the auxiliary positioning support of the workpiece.

In this embodiment, the visual component consists of an industrial camera, a lighting system, an image acquisition card, an industrial computer, and a control system.

After welding is completed, the workpiece is transported from the conveying assembly II to the visual assembly. Specifically, the industrial camera takes photos of the weld seam, and the image acquisition card saves the collected weld seam photos to the industrial computer for detection and analysis through image processing methods. The control system interfaces with the MES control system and uploads the obtained results to the data service center for establishing real-time quality warnings and automatic error prevention. When the visual detection result is qualified, the material is transported from the conveying assembly II to the position of the upper and lower feeding devices to achieve unloading. If the test results are not qualified, the conveying assembly II will be transported to the gluing station and welding station for repair.

In this embodiment, the data acquisition and transmission system of the production line for welding the automobile rear floor panels is based on the RS485 bus and Ethernet signal acquisition system, which is connected with the MES control system to achieve real-time data acquisition and upload to the MES central control management system. Specifically, it includes: uploading barcode markings on the workpiece before feeding, receiving workpiece data uploaded by the visual sensor of the workpiece model during the gluing process, analyzing the corresponding workpiece model by the MES control system based on the workpiece model data and calling the corresponding gluing program and welding process parameters, receiving welding parameters uploaded by the editor during the welding process, real-time monitoring of changes in welding current, voltage, etc., receiving welding quality data generated by the visual detection system, and uploading the quality data to the data service center for subsequent product traceability. It realize the collection and integrated utilization of workpiece loading, key welding processes, and finished product detection data during the welding process of the rear floor panels of automobiles.

Embodiment 2

In another typical embodiment of the present disclosure, as shown in FIGS. 1 to 16, a working method using a production line for welding the automobile rear floor panels is provided.

A working method of the production line for welding automotive rear floor panels described in Embodiment includes the following steps:

Loading a workpiece from the loading and unloading station to the fixture of the conveying assembly II, then the workpiece following the fixture along the rounded rectangle trajectory to pass through the gluing station, the welding station, and the detection station in sequence;

Coating glue to the workpiece at the gluing station, and welding the front end of the workpiece at the gluing station after the gluing is completed;

Welding a non-end part of the workpiece at the welding station;

Welding a rear end of the workpiece at the detection station before detecting the workpiece at the detection station, and conducting detection after the welding is completed;

Offloading the qualified workpiece at the loading and unloading station, while repairing the unqualified workpiece at the gluing station, the welding station, and the detection station again until the unqualified workpiece pass the detection before offloading.

The front end of the workpiece is welded at a rear end of the straight path corresponding to the gluing station, and the rear end of the workpiece is welded at the front end of the straight path corresponding to the detection station.

When welding a workpiece on the gluing station, a welding gun IV-1 of the first welding mechanism stretches into the wheel housing at an end of the workpiece to weld from bottom to top. When welding a workpiece on the detection station, the welding gun IV-1 of the second welding mechanism stretches into the wheel housing at the end of the workpiece to weld from bottom to top.

By using the rounded rectangle workpiece conveying path, when the direction is adjusted during the workpiece conveying process, the posture relative to the previous station also changes. The welding mechanism of the previous station or the welding mechanism of the next station is used to weld the position of the wheel housing of the workpiece and weld from the lower part of the wheel housing upward. The molten pool and welding slag after welding are not easy to attach to the workpiece under gravity to cause defects, and can avoid the reinforcement structure on the workpiece, reduce interference with the workpiece structure, and improve the welding efficiency.

The above is only preferred embodiments of the present disclosure and is not intended to limit it. For those skilled in the art, the present disclosure may have various modifications and variations. Any modifications, equivalent substitutions, improvements, etc. made within the spirit and principles of the present disclosure shall be included within the scope of the present disclosure.

What is claimed is:

1. A production line for welding automotive rear floor panels, comprising:

a conveying assembly, comprising a fixture running along a rounded rectangular trajectory, wherein the rounded rectangular trajectory is divided into four straight paths along a running direction, and the fixture is provided with a clamping part to carry a workpiece;

a working device, comprising a loading and unloading station, a gluing station, a welding station, and a detection station corresponding to the four straight paths; wherein the welding station comprises at least three welding mechanisms, a first welding mechanism is capable of acting on an end of the workpiece at the gluing station, and a second welding mechanism is capable of acting on the end of the workpiece at the detection station.

2. The production line for welding automotive rear floor panels according to claim 1, wherein the first welding mechanism is located on an extension line of the straight path corresponding to the gluing station, and the first welding mechanism is configured to weld a wheel housing at the end of the workpiece on the gluing station from bottom to top.

3. The production line for welding automotive rear floor panels according to claim 1, wherein the second welding mechanism is located on an extension line of the straight path corresponding to the detection station, and the second welding mechanism is configured to weld the wheel housing at the end of the workpiece on the detection station from bottom to top.

4. The production line for welding automotive rear floor panels according to claim 1, wherein the loading and unloading station is arranged with a loading and unloading assembly, the gluing station is provided with a gluing assembly, and the detection station is provided with a detection assembly.

5. The production line for welding automotive rear floor panels according to claim 4, wherein adjacent straight paths are connected by arc-shaped trajectories.

6. The production line for welding automotive rear floor panels according to claim 5, wherein the fixture runs in cycle along the rounded rectangular trajectory.

7. The production line for welding automotive rear floor panels according to claim 1, wherein the conveying assembly further comprises a driving chain, a guide rail, and a track patrol vehicle; the driving chain is a rounded rectangle with a closed end-to-end connection, the guide rail is distributed outside the driving chain, the track patrol vehicle moves along the guide rail, one side of the track patrol vehicle is connected to the driving chain to obtain power, and the fixture is installed on the track patrol vehicle.

8. The production line for welding automotive rear floor panels according to claim 7, wherein corner positions of the driving chain are matched with sprockets, and at least one of the sprockets is a driving sprocket; and the driving sprocket drives the driving chain to rotate when the driving sprocket is driven by a rotation driving component.

9. The production line for welding automotive rear floor panels according to claim 8, wherein a plurality of the track patrol vehicles are sequentially spaced along a rotation direction of the driving chain.

10. The production line for welding automotive rear floor panels according to claim 7, wherein the guide rail is a rounded rectangle shape, and arc ends at corner positions of the guide rail and arc ends at corner positions of the driving chain are concentrically distributed.

11. A working method of the production line for welding automotive rear floor panels according to claim 1, comprising:

loading a workpiece from the loading and unloading station to the fixture of the conveying assembly, then the workpiece following the fixture along the rounded rectangle trajectory to pass through the gluing station, the welding station, and the detection station in sequence;

coating glue to the workpiece at the gluing station, and welding the front end of the workpiece at the gluing station after the gluing is completed;

welding a non-end part of the workpiece at the welding station;

welding a rear end of the workpiece at the detection station before detecting the workpiece at the detection station, and conducting detection after the welding is completed; and offloading the qualified workpiece at the loading and unloading station, while repairing the unqualified workpiece at the gluing station, the welding station, and the detection station again until the unqualified workpiece pass the detection before offloading.

12. The working method of the production line for welding automotive rear floor panels according to claim 11, wherein the front end of the workpiece is welded at a rear end of the straight path corresponding to the gluing station.

13. The working method of the production line for welding automotive rear floor panels according to claim 12, wherein when welding a workpiece on the gluing station, a welding gun of the first welding mechanism stretches into the wheel housing at an end of the workpiece to weld from bottom to top.

14. The working method of the production line for welding automotive rear floor panels according to claim 11, wherein the rear end of the workpiece is welded at the front end of the straight path corresponding to the detection station.

15. The working method of the production line for welding automotive rear floor panels according to claim 14, wherein when welding the workpiece on the detection station, the welding gun of the second welding mechanism stretches into the wheel housing at the end of the workpiece to weld from bottom to top.

* * * * *